United States Patent Office 3,655,878
Patented Apr. 11, 1972

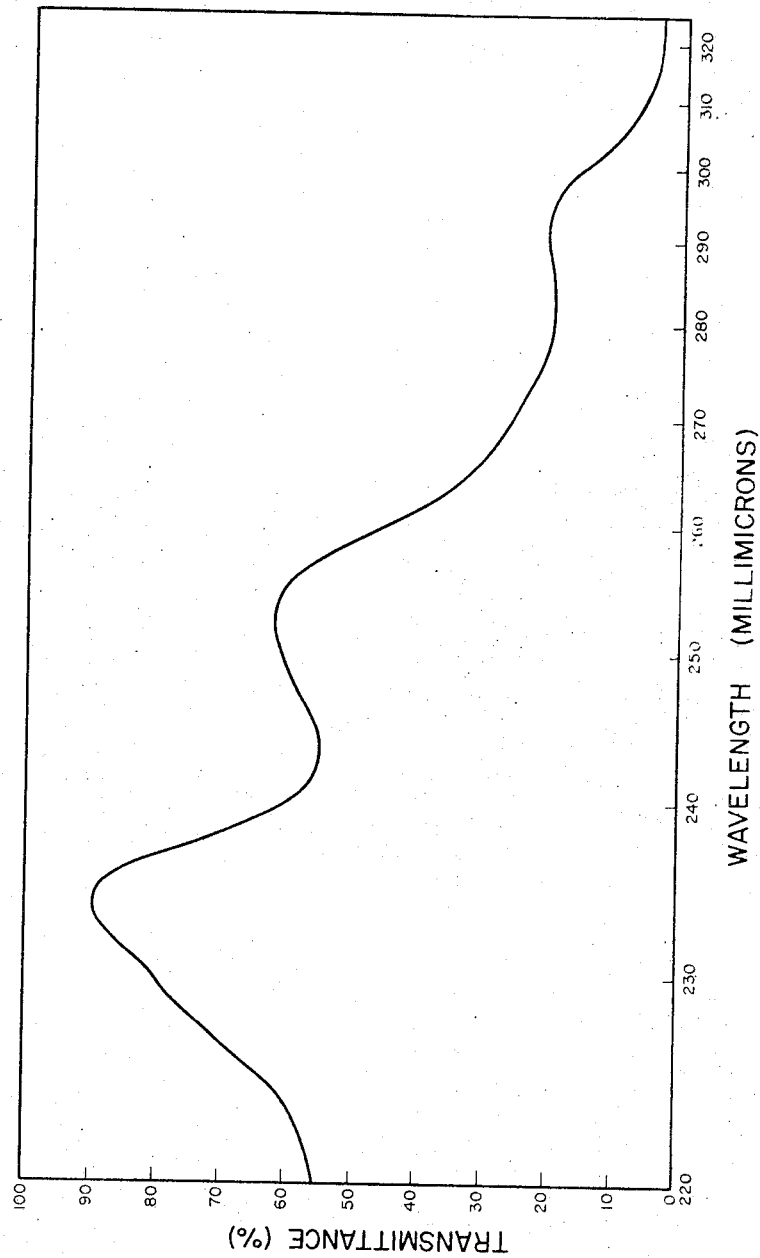

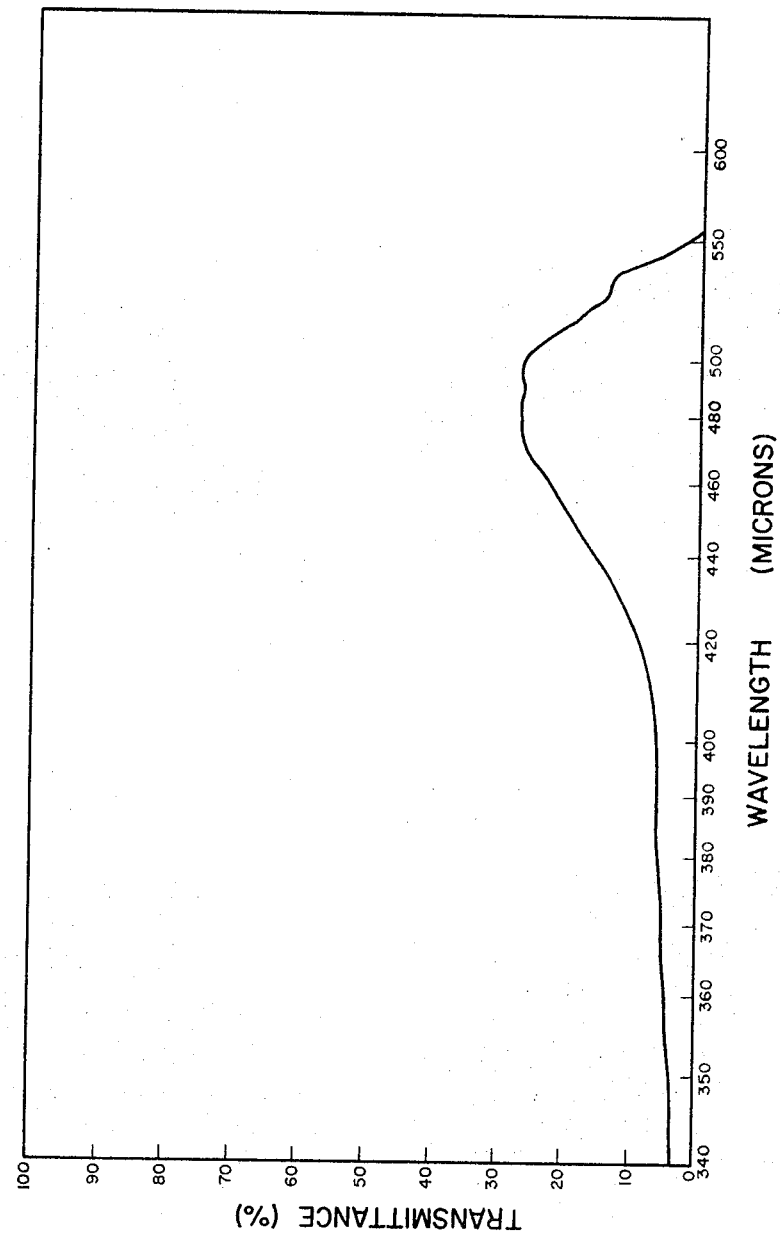

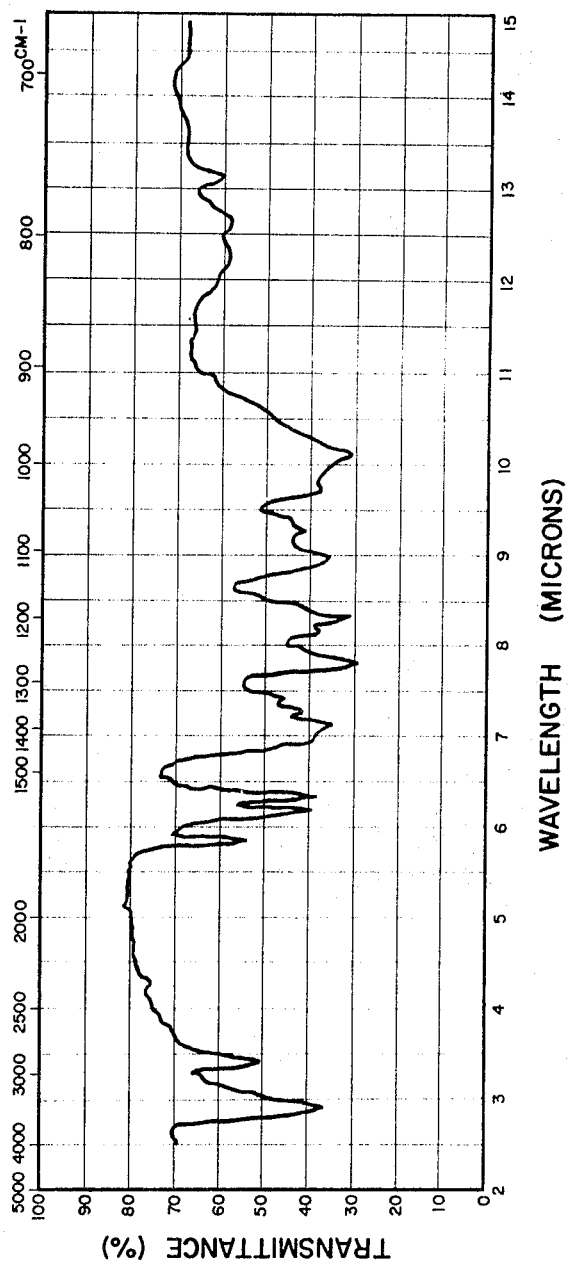

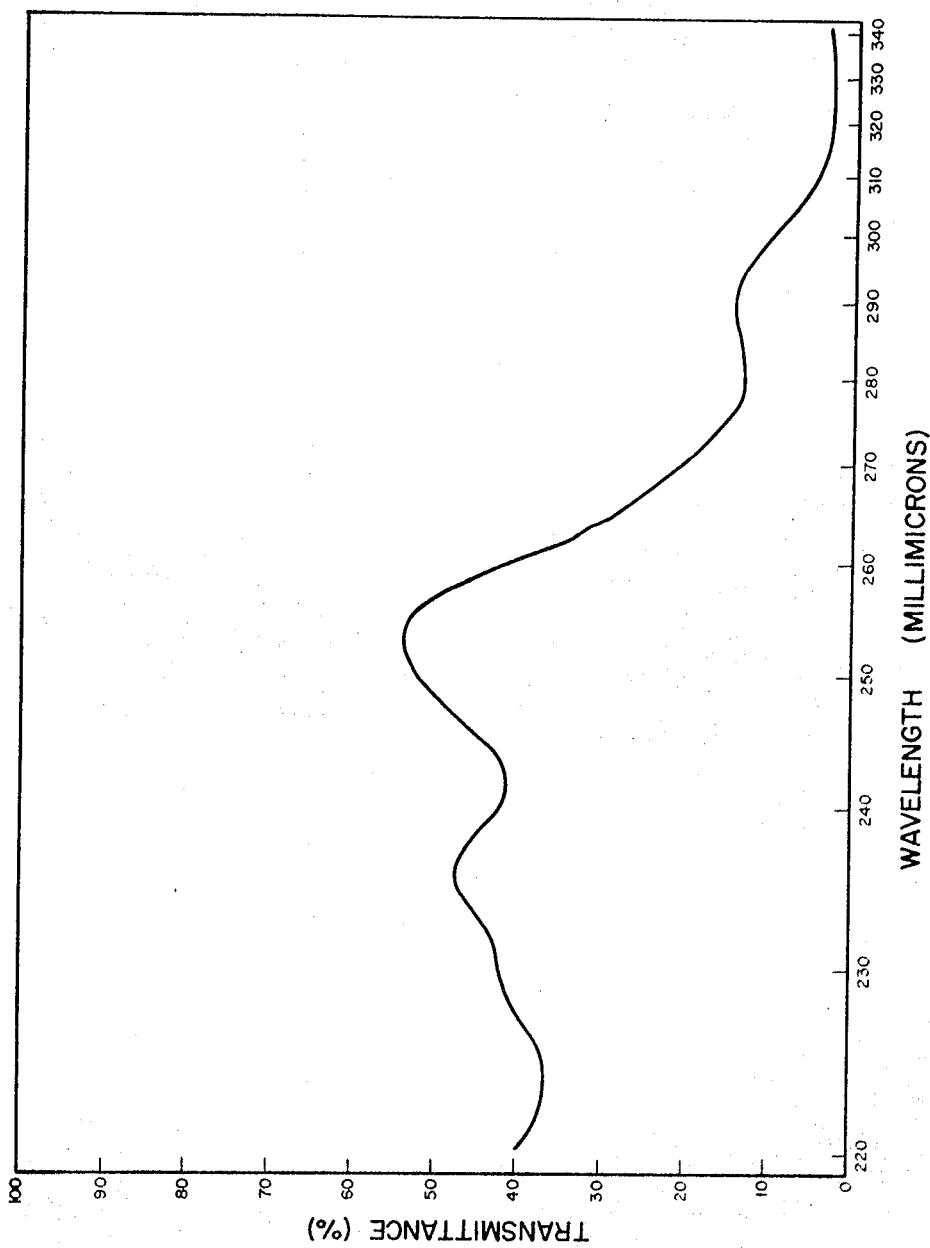

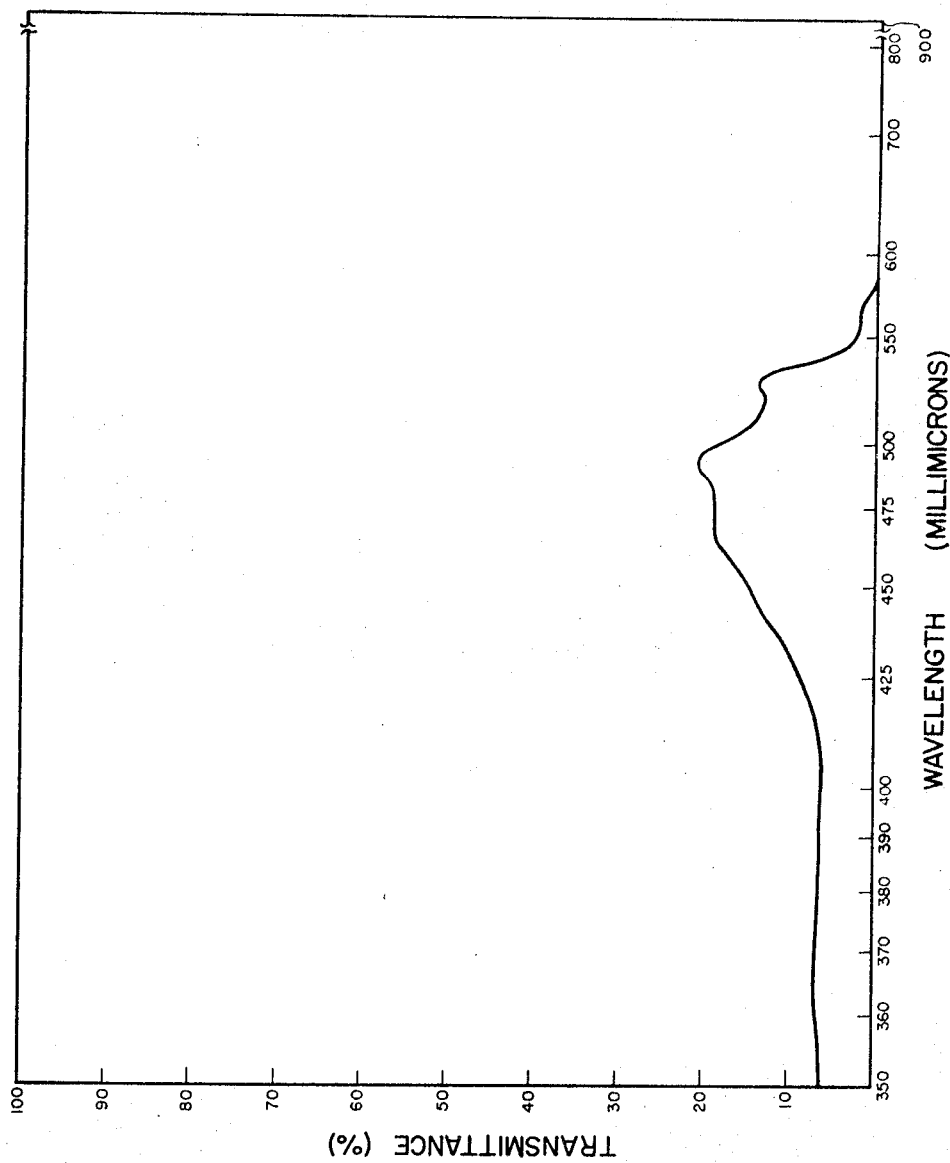

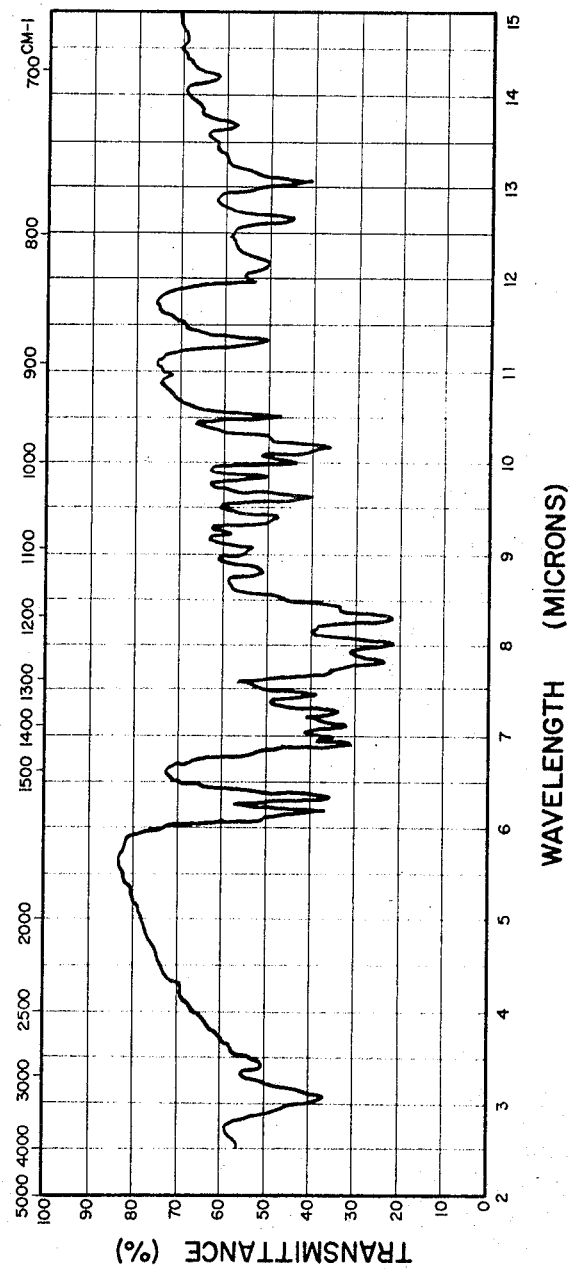

3,655,878
LATERIOMYCINS A AND B AND PRODUCTION THEREOF
Eiji Higashide, Takarazuka, Toru Hasegawa, Suita, Motoo Shibata, Toyonaka, and Komei Mizuno, Suita, Japan, assignors to Takeda Chemical Industries, Ltd., Osaka, Japan
Filed June 28, 1965, Ser. No. 467,505
Int. Cl. A61k 21/00
U.S. Cl. 424—121      5 Claims

ABSTRACT OF THE DISCLOSURE

Lateriomycin A and Lateriomycin B, produced by aerobically culturing a Lateriomycin A- and B- producing strain of Streptomyces griseoruber Yamaguchi & Saburi in a culture medium at about 25–35° until substantial antimicrobial activity is imparted to the culture and separately recovering the desired products, are useful in vitro as disinfectants, and in the treatment of Staphylococcus infections.

---

This invention relates to novel and antibiotically active compounds and to their production. More particularly, this invention relates to a group of antibiotics named Lateriomycin A and Lateriomycin B, respectively (these may each be, referred to as "Lateriomycin" unspecifiedly, or may be inclusively referred to as "Lateriomycins," hereinafter).

The invention was made on the basis of the following findings:

(1) Streptomyces griseoruber No. 71070, a new strain isolated by the present inventors from a sample of soil collected in Aqua Blanca, Mexico, is capable of producing two kinds of new antibiotics;
(2) the antibiotics are accumulated when the microorganism is incubated in a nutrient medium;
(3) the so-accumulated antibiotics can be recovered respectively in a desired purity from the culture broth, utilizing the physico-chemical properties of the antibiotics; and
(4) the antibiotics have respectively strong antimicrobial activities against Gram-positive bacteria.

The new antibiotics have been named "Lateriomycin A" and "Lateriomycin B," respectively.

In the method of the present invention, microorganisms which belong to Streptomyces griseoruber Yamaguchi & Saburi and may produce Lateriomycin are employed. These microorganisms comprise for example (a) Streptomyces griseoruber No. 71070 mentioned above, and (b) mutants and variants thereof.

The morphological and cultural characteristics of Streptomyces griseoruber No. 71070 are as follows. In the following characteristics, the color names designated by the attachment of the color names following "Rdg" are based on "Ridgway's Colour Standards and Nomenclature."

(a) Morphological characteristics:

The aerial mycelium develops well on glucose asparagine agar and its color is white at first and then changes to Pale Vinaceous Pink or Pale Mouse Gray. The sporophore forms loops or spirals and the spore is ellipsoidal or oval, 0.5–0.8μ x 1.0–1.3μ and smooth on the surface.

(b) Cultural characteristics:

Czapek's agar:

Vegetative mycelium (referred to as VM, hereinafter): Abundant, wrinkled, colorless later Congo Pink (Rdg. XXVIII, 7″–b).
Aerial mycelium (referred to as AM, hereinafter): Velvety, chalk white later Pallid Mouse Gray (Rdg. LI, 15‴″–f).
Soluble pigment (referred to as SP, hereinafter): Light Pinkish Cinnamon (Rdg. XXIX, 15″–d).

Glycerin Czapek's agar:

VM: Moderate, Pale Vinaceous-Drab (Rdg. XLV, 5‴–d) to Dark Vinaceous-Drab (Rdg. XLV, 5″″–i).
AM: Thin, Pallid Purple-Drab (Rdg. XLV, 1‴–f) to Pale Quaker Drab (Rdg. LI, 1‴″–d).
SP: Faint brown.

Glucose Czapek's agar:

VM: Abundant, wrinkled, Light Vinaceous-Cinnamon (Rdg. XXIX, 13″–d) to Fawn Color (Rdg. XL, 13‴).
AM: Thin, Pallid Vinaceous-Drab (Rdg. XLV, 5″″–f).
SP: Paint brown or none.

Glucose asparagine agar:

VM: Abundant, Buff-Pink (Rdg. XXVIII, 11″–d) to Pale Congo Pink (Rdg. XXVIII, 7″–f).
AM: Velvety, Pale Vinaceous-Pink (Rdg. XXVIII, 9″–f) to Pale Mouse Gray (Rdg. LI, 15‴″–d).
SP: Salmon-Buff (Rdg. XIV, 11′–d).

Nutrient agar:

VM: Moderate, colorless later dark brown.
AM: Poor, powdery, white to Pale Mouse Gray.
SP: Dark brown.

Nutrient broth:

VM: Moderate, faint brown film without sediment.
AM: White to Pallid Mouse Gray.
SP: Blackish brown.

Glucose nutrient broth: Almost same as on nutrient broth, but growth is more abundant and lichenoid.

Glucose nutrient agar:

VM: Abundant, wrinkled, dark brown.
AM: Thin, chalk white to Pallid Quaker Drab (Rdg. LI, 1‴″–f).
SP: Dark brown.

Glycerin nutrient agar:

VM: Abundant, wrinkled, dark brown.
AM: Poor, chalk white.
SP: Dark brown.

Glycerin nutrient broth: Almost same as on glucose nutrient broth.

Starch agar:

VM: Abundant, Pallid Vinaceous Drab (Rdg. XLV, 5″″–f) to Vinaceous-Lavender (Rdg. XLIV, 65‴–f).
AM: Abundant, velvety, white to Vinaceous-Lavender.
SP: Pale Persian Lilac (Rdg. XXXVIII, 69″–f) or none.

Egg medium (37° C.):
  VM: Abundant, spreading, brownish black.
  AM: Poor, white to Pale Quaker Drab.
  SP: Color of medium become milky white.
Yeast extract agar:
  VM: Abundant, wrinkled, Buff-Pink (Rdg. XXVIII, 11″-d) to brown.
  AM: Abundant, velvety, chalk white to Pallid Mouse Gray.
  SP: Army Brown (Rdg. XL, 13‴-i).
Potato plug:
  VM: Abundant, wrinkled, Pale Purple-Drab (Rdg. XLV, 1″″-d) to Pale Quaker Drab.
  AM: Poor, Mouse Gray.
  SP: Dark brown.
Milk (37° C.: Cream colored ring formed, weak peptonization without coagulation.
Nutrient gelatin (25° C.):
  VM: Poor, lichenoid, dark brown.
  AM: Poor, white to Mouse Gray.
  Liquefaction slow.
Nitrate reduction in Czapek's solution: No reduction.
Cellulose: No growth.
Hydrolysis on starch agar: Hydrolysis, growth zone/enzymatic zone=11–13 mm./15–17 mm.
Peptone agar:
  VM: Thin, spreading, dark brown.
  AM: Thin, powdery, while to Mouse Gray.
  SP: Dark brown.
Calcium malate agar:
  VM: Abundant, Pale Salmon Color (Rdg. XIV, 9′-f) to Flesh Color (Rdg. XIV, 7′-d).
  AM: Abundant, velvety, white to Mouse Gray.
  SP: None or Light Pinkish Cinnamon (Rdg. XXIX, 15″-d).
Carrot plug:
  VM: Abundant, wrinkled.
  AM: Poor, white to Orient Pink (Rdg. II, 9-f) to Light Mouse Gray.
  SP: Faint brown.
Tyrosine agar:
  VM: Thin, colorless to Ivory Yellow (Rdg. XXX, 21″-f).
  AM: None.
  SP: None.

On synthetic media the vegetative mycelium of this strain develops well and it is colorless at first, but changes to pale orange or pale pink, and a pale yellowish brown or pale pink soluble pigment is produced. On a medium containing protein the color of vegetative mycelium is pale brown or dark brown, while white or Pallid Mouse Gray aerial mycelia are formed. The soluble pigment is brown or blackish brown. From the above-mentioned characteristics, this strain is found to belong to chromogenic type.

(c) Carbon source utilization observed by Pridham's method

| Carbon source | Growth | Carbon source | Growth |
|---|---|---|---|
| Erythritol | − | D-maltose | +++ |
| D-sorbitol | + | Sucrose | +++ |
| i-Inositol | +++ | Lactose | +++ |
| D-mannitol | +++ | Raffinose | +++ |
| Dulcitol | ± | Trehalose | +++ |
| D-ribose | ++ | Salicin | − |
| D-xylose | +++ | Inulin | |
| L-arabinose | +++ | Cellobiose | +++ |
| D-galactose | +++ | Glycerin | +++ |
| D-glucose | +++ | Na-acetate | + |
| D-fructose | +++ | Na-succinate | ++ |
| L-rhamnose | +++ | Na-citrate | + |
| | | Control | − |

Remarks:
+++: Very good growth
++: Good growth
+: Fair growth
±: Faint growth
−: No growth Comparison of the above-mentioned microbial properties with the description in "The Actinomycetes, Volume II" writen by S. A. Waksman, published by The Williams and Wilkins Company in 1961, shows that the strain usable in the present invention is similar in cultural characteristics to *Streptomyces fervens* De Boer et al., *Streptomyces purpurascens* Lindenbein and *Streptomyces griseoruber* Yamaguchi & Saburi. However, there are some differences in the morphological characteristics of the strain from those of *Streptomyces fervens* De Boer et al. and *Stroptomyces purpurascens* Lindenbein. More sepcifically, *Streptomyces fervens* De Boer et al. forms monoverticillate or biverticillate branching, and the spore of *Streptomyces purpurascens* Lindenbein is spinous on the surface. In contrast, the present strain does not form such branching and its spore is smooth on the surface. On the other hand, *Streptomyces griseoruber* Yamaguchi & Saburi appears to coincide with the present strain in morphological characteristics. Hence, the present strain is classified by the inventors as belonging to *Streptomyces griseoruber* Yamaguchi & Saburi, and named *Streptomyces griseoruber* No. 71070.

A specimen of *Streptomyces griseoruber* No. 71070 was deposited at American Type Culture Collection, Maryland, U.S.A., under the accession number ATCC 17919.

The antibacterial spectrum observed by the cross-streak method of *Streptomyces griseoruber* No. 71070 on bouillon agar and glycerin bouillon agar is shown in Table 1. *Streptomyces griseoruber* No. 71070 was streaked on agar plates and incubated at 28° C. for four days. The plates were then cross-streaked with test organisms shown in Table 1 and were further incubated at 37° C. for twenty hours for Gram-positive and Gram-negative bacteria, or for forty hours for acid fast bacteria. Finally the inhibition length for each test organism was measured.

Antibacterial spectrum of *Streptomyces griseoruber* No. 71070 by cross streak method]

| | Inhibitory zone (mm.) | | | |
|---|---|---|---|---|
| | Bouillon agar | | Glycerin bouillon agar | |
| Escherichia coli | 3 | 3 | 2 | 2 |
| Proteus vulgaris | 0 | 0 | 7 | 6 |
| Staphylococcus aureus | 13 | 13 | 6 | 7 |
| Bacillus subtilis | 14 | 15 | 8 | 8 |
| Bacillus cereus | 11 | 11 | 0 | 0 |
| Bacillus brevis | 13 | 13 | 0 | 0 |
| Sarcina lutea | 17 | 18 | 7 | 6 |
| Micrococcus flavus | 14 | 15 | 7 | 7 |
| Aerobacter aerogenes | 0 | 0 | 0 | 0 |
| Pseudomonas aeruginosa | 0 | 0 | 3 | 3 |
| Mycobacterium avium | | | 0 | 0 |
| Mycobacterium smegmatis | | | 0 | 0 |
| Mycobacterium phlei | | | 0 | 0 |

Table 1 shows that *Streptomyces griseoruber* No. 71070 produces antibiotic substances mainly active against Gram-positive bacteria.

The microbial characteristics of actinomycetes, especially the genus Streptomyces, are not generally fixed and this applies also to the characteristics of *Streptomyces griseoruber* No. 71070. Therefore, there may be many natural or induced mutants and variants of *Streptomyces griseoruber* No. 71070.

Among the mutants and variants of *Streptomyces griseoruber* No. 71070, regardless of whether the variation may be caused spontaneously or inducedly, for example, with X-ray, ultraviolet-ray or by the action of chemical reagents, any one capable of producing Lateriomycin may be employed in the method of the present invention.

In the method of the present invention, a Lateriomycin-producing strain belonging to *Streptomyces griseoruber* Yamaguchi and Saburi is incubated on a medium containing assimilable carbon sources, digestible nitrogen sources and other necessary nutrients. As the carbon sources, for example, starch, glucose, lactose, maltose, galactose, sucrose, dextrin, glycerol or millet jelly may be employed.

As the nitrogen sources, for example, peptone, soybean flour, corn-steep liquor, meat extract, ammonium salts, or other organic or inorganic nitrogen compounds may be employed. Further, a small quantity of inorganic salts such as sodium chloride, phosphates, salts of metals such as calcium, zinc, manganese, iron may be added to the medium. And, if necessary, conventional nutrient factors an antifoaming agent such as animal oil or wax, vegetable oil or mineral oil may be added.

For the culture of Lateriomycin-producing strain, submerged culture utilizing liquid medium is preferable. But, as occasion demands, shaking culture may be conducted for the purpose. However, cultural conditions such as temperature, culture period and pH of the medium should be determined to obtain the desired antibiotic or antibiotics in a yield as good as possible. When a submerged culture is employed, the production of Lateriomycins becomes maximum generally under such conditions as at a temperature of 25 to 35° C., at around neutral pH and with a culture period of about 2 to 6 days. Lateriomycins thus produced are contained mostly in the mycelia, but also in the liquid part of the culture broth. Lateriomycins thus accumulated in the culture broth are recovered and refined in a desired purity respectively by utilizing physico-chemical properties of Lateriomycin, for example, differences between Lateriomycins and the impurities and between Lateriomycin A and B in solubility, in distribution co-efficient between two liquid phases, in adsorbability, or in ion-coherence. For example, the following means are preferably used for the recovery of Lateriomycin. The mycelia or liquid part separated from the culture broth of Lateriomycin-producing strain is extracted with an appropriate organic solvent. The solvents for the extraction are, for example, ketones such as acetone, methyl ethyl ketone, acetic esters such as ethyl acetate, butyl acetate, alcohols such as methanol, ethanol, hydrocarbon halide such as chloroform, trichloroethane, or benzene. When thus-obtained solution is subjected to extraction with an acid solution adjusted to pH about 2 to 6 with an appropriate acid, for example, hydrochloric acid, sulfuric acid, phosphoric acid, acetic acid, Lateriomycins are divided into the basic fraction (designated as fraction MA hereafter) and the neutral fraction (designated as fraction MB). Fraction MA is, after being neutralized, re-extracted with any of the above-mentioned organic solvents. The extract is concentrated and is then added to a non-polar or less-polar organic solvent, such as petroleum ether or diethyl ether, to obtain orange-yellow powder. This crude powder can be purified by such a means as adsorption-, partition- or ion-exchange-chromatography or counter-current distribution. As the adsorbent or hanger in chromatography, silica gel, activated charcoal, activated alumina, magnesium silicate, may be employed. When silica gel is used as the adsorbent, ethyl acetate is counted as one of the most preferable developers. In this case, the crude powder is dissolved in an appropriate solvent, e.g. a mixture of ethyl acetate and methanol, the solution is passed through a tower or a column packed with silica gel, and the tower or column is washed with benzene, and then eluted with ethyl acetate to obtain an effluent showing antimicrobial activity. Thus-obtained effluent is concentrated under reduced pressure to give Lateriomycin A as orange-red needles.

On the other hand, the above-said fraction MB is concentrated under reduced pressure to obtain dark reddish oily substance. This oily substance may be purified by such a process as adsorption-, partition- or ion-exchange-chromatography or counter-current distribution. As the adsorbent or hanger in chromatography, silica gel, activated charcoal, activated alumina, magnesium silicate may be employed. When silica gel is used as the adsorbent, ethyl acetate is one of the most preferable developers. In this case, the oily substance is dissolved in an appropriate solvent such as methanol, the solution is passed through a tower or a column packed with silica gel and the tower or column is washed with petroleum ether and diethyl ether, and then eluted with ethyl acetate to obtain an effluent showing antimicrobial activity. Thus-obtained effluent is concentrated under reduced pressure to give Lateriomycin B as reddish-orange needles.

The physico-chemical properties of Lateriomycin A and Lateriomycin B thus purified are as follows:

Lateriomycin A (1) Elementary analysis:

| Test No. | Carbon (percent) | Hydrogen (percent) | Nitrogen (percent) |
| --- | --- | --- | --- |
| (I) | 60.13 | 5.84 | 1.90 |
| (II) | 60.15 | 6.06 | 1.92 |
| (III) | 60.18 | 6.02 | 2.01 |
| | 60.15±0.50 | 6.00±0.30 | 2.00±0.50 |

(2) Specific rotation: $[\alpha]_D^{21} = +186° \pm 20$ (c.=0.7%, in chloroform).

(3) Melting point: It melts with decomposition at 202–206° C.

(4) Absorption spectrum: The ultraviolet absorption spectrum and the visible light absorption spectrum of Lateriomycin A in methanol are respectively as shown on FIGS. 1 and 2 of the accompanying drawing.

The significant maximum absorptions observed are as follows:

$$\lambda_{max}^{MeOH} \ 234 \ m\mu \ (E_{1cm.}^{1\%} = 581)$$
$$253 \ m\mu \ (E_{1cm.}^{1\%} = 403)$$
$$290 \ m\mu \ (E_{1cm.}^{1\%} = 131)$$
$$480 \ m\mu \ (E_{1cm.}^{1\%} = 176)$$
$$495 \ m\mu \ (E_{1cm.}^{1\%} = 176)$$
$$\text{Shoulder } 533 \ m\mu$$

The infrared absorption spectrum of Lateriomycin A measured by the potassium bromide disk method is as shown in FIG. 3 of the accompanying drawing.

The significant absorption bands in microns are as follows: 3.07(m.), 3.43(w.), 6.10(sh.), 6.18(s.), 6.33(s.), 6.93(s.), 7.00(m.), 7.12(s.), 7.28(s.), 7.45(m.), 7.72(w.), 7.82(s.), 8.02(s.), 8.30(s.), 8.80(m.), 9.10(m.), 9.25(w.), 9.41(m.), 9.63(m.), 9.85(m.), 10.01(m.), 10.17(s.), 10.52(m.), 10.97(w.), 11.34(m.), 12.00(w.), 12.15(m.), 12.67(m.), 13.08(m.), 13.70(w.), 14.22(w.).

Note: s., strong; m., medium; sh., shoulder; w., weak.

(5) Molecular weight: Measurement of its molecular weight by means of osmometric method in chloroform gave the values 1151 and 1330.

(6) Color reaction: It is positive to Molisch's reaction and ferric chloride reagent, but negative to ninhydrin reaction, biuret reaction, Fehling's reagent, Ehrlich's reagent and Pauly's reagent. It changes to orange yellow in methanolic acid solution and to purple in an alkaline solution.

(7) Solubility: It is soluble in methanol, ethanol, butanol, acetone, chlorofrom and benzene, and slightly soluble in diethyl ether, but insoluble in petroleum ether and water.

Lateriomycin B (1) Elementary analysis: carbon (percent), 65.21; hydrogen (percent), 5.22; oxygen (percent), 30.09.

(2) Specific rotation: $[\alpha]_D^{21} = -68° \pm 3°$ (c.=0.06%, in chloroform).

(3) Melting point: It melts with decomposition at 234–236° C.

(4) Absorption spectrum: The ultraviolet absorption spectrum and the visible light absorption spectrum of Lateriomycin B in methanol are respectively shown in FIGS. 4 and 5 of the accompanying drawing.

The significant maximum absorptions observed are as follows:

$$\lambda_{max.}^{MeOH} \ 236 \ m\mu \ (E_{1cm.}^{1\%}=716)$$
$$253 \ m\mu \ (E_{1cm.}^{1\%}=864)$$
$$290 \ m\mu \ (E_{1cm.}^{1\%}=227)$$
$$490 \ m\mu \ (E_{1cm.}^{1\%}=348)$$
$$529 \ m\mu \ (E_{1cm.}^{1\%}=226)$$

The infrared absorption spectrum of Lateriomycin B measured by potassium bromide disk is as shown in FIG. 6 of the accompanying drawing.

The significant absorption bands in microns are as follows: 2.92(s.), 3.40(sh.), 3.43(m.), 5.85(m.), 6.18(s.), 6.33(s.), 6.95(w.), 7.10(s.), 7.27(w.), 7.42(w.), 7.80(s.), 8.15(w.), 8.30(s.), 8.95(m.), 9.27(w.), 9.39(w.), 9.70(w.), 9.95(sh.), 10.10(s.), 11.40(sh.), 11.95(sh.), 12.30(w.), 12.65(w), 1312(w.).

Note: s., strong; m., medium; sh., shoulder; w., weak.

(5) Molecular weight: About 410 by the osmometric method in chloroform.

(6) Color reaction: It is positive to Molisch's reaction and ferric chloride reagent, but negative to biuret reaction and Fehling's reagent. It changes to orange yellow in methanolic acid solution and to purple in an alkaline solution.

(7) Solubility: It is soluble in methanol, ethanol, butanol, acetone, chloroform and benzene, but insoluble in petroleum ether and water.

The biological properties of Lateriomycin A and Lateriomycin B are as follows:

(1) Antimicrobial spectra: Antimicrobial activities of Lateriomycin A and Lateriomycin B against various microorganisms are shown in Table 2.

Gram-positive or negative bacteria employed as the test organisms are incubated on bouillon agar at 37° C. for twenty-four hours. For acid-fast bacteria glycerin bouillon agar is used and incubated at 37° C. for forty-eight hours. In the case of employing fungi or yeast, glucose bouillon agar is used as incubation medium and the incubation is carried out for forty-eight hours at 28° C.

TABLE 2

[Antimicrobial spectra of Lateriomycin A and Lateriomycin B shown by minimum inhibitory concentration (μg./ml.)]

| Test organisms | Lateriomycin A | Lateriomycin B |
|---|---|---|
| Escherichia coli | >100 | >100 |
| Proteus vulgaris | >100 | >100 |
| Psudomonas aeruginosa | >100 | >100 |
| Bacillus subtilis | 0.1 | 3–5 |
| Bacillus cereus | 0.2 | 5 |
| Bacillus brevis | 0.2 | 2–3 |
| Staphylococcus aureus | 0.5 | 5–10 |
| Sarcina lutea | 0.05 | 5 |
| Micrococcus flavus | 0.05 | 2 |
| Mycobacterium avium | 20 | 20 |
| Mycobacterium 607 | 20 | >100 |
| Mycobacterium smegmatis | 10 | 10 |
| Mycobacterium phlei | 20 | >100 |
| Saccharomyces cerevisiae | >100 | >100 |
| Candida albicans | >100 | >100 |
| Penicillium chrysogenum | >100 | >100 |
| Aspergillus niger | >100 | >100 |

As is seen in Table 2, Lateriomycin A shows strong antimicrobial activities against Gram-positive bacteria. While Lateriomycin B shows antimicrobial activities against Gram-positive bacteria, its activities are rather weaker than those of Lateriomycin A.

As is seen in Table 3, both Lateriomycin A and B show stronger activities on basic assay media than on neutral or acid media, which means that, they seem to belong to so-called physiologically basic substances.

TABLE 3

[Difference of antibacterial activities by pH-changes of Lateriomycin A and Lateriomycin B]

| pH (Bouillon plate) | Inhibitory zone (mm.) | | | |
|---|---|---|---|---|
| | Lateriomycin A | | Lateriomycin B | |
| 6.0 | 14.5 | 14.5 | 10 | 10 |
| 7.0 | 17.5 | 17.5 | 12 | 13 |
| 8.0 | 19 | 19 | 14.5 | 14.5 |

Bacillus subtilis was used as a test organism.

(2) Toxicity:

(a) Lateriomycin A: The acute toxicity in mice by intraperitoneal administration shows that lethal doses are 0.4–0.8 milligram per kilogram of body weight.

(b) Lateriomycin B: The medium lethal dose in mice is about 6.25 milligrams per kilogram of body weight by intraperitoneal administration.

On comparison of the above-mentioned physico-chemical and biological properties of Lateriomycin A and Lateriomycin B with those of the hitherto-known antibiotics, Lateriomycin A and Lateriomycin B are respectively found to be a novel antibiotic. From these characteristics mentioned above, Lateriomycin A is assumed to resemble following known antibiotics:

(1) "Pluramycin" described in "The Journal of Antibiotics" Series A, volume 9, pages 75–81, published by Japan Antibiotics Research Association in March 1956.

(2) "Ractiomycin" described in "The Journal of Antibiotics" Series A, volume 8, pages 132–135, published in August 1955.

(3) "Danubomycin" described on the specification of the U.S. Patent No. 3,092,550 issued on Oct. 1, 1958.

(4) "Antibiotic 289" described in "The Journal of Antibiotics" Series A, volume 6, pages 45–51, published in February 1953.

(5) "Luteomycin" described in "The Journal of Antibiotics" Series A, volume 3, page 313–319, published in August 1950.

(6) "Antibiotic $_{SKCC}$ 1377" reported on "The Production and Isolation of an Antibiotic from a Soil Actinomycetes" in "Bacteriological Proceedings," 1952, page 26.

(7) "Vinacetin" described in "The Journal of Antibiotics" Series A, volume 6, pages 73–79, published in April 1953.

(8) "Rifamycin S" reported on "Rifomycin IX. Two New Antibiotics of Rifomycin Family: Rifomycin S and Rifomycin SV. Preliminary report" in "Experientia," volume 16, page 412, published in 1960.

(9) "Xanthomycin" described in "Journal of Biological Chemistry," volume 176, pages 413–428, published in October 1948.

(10) "Antibiotic 13057 RP" and "Antibiotic 13214 RP" described in the specification of Belgian Patent No. 632,391 issued on May 15, 1963 and in the Japanese patent application laid open to public inspection as of May 7, 1965 under Publication Number of Sho. 40/8,820.

(11) "Miromycin" described in the Japanese patent application laid open to public inspection as of May 14, 1964 under Publication Number Sho. 39/7,396.

(12) "Mezzanomycin" described in the Japanese patent application laid open to public inspection as of May 14, 1964 under Publication Number Sho. 39/7,397.

But obviously Lateriomycin A is differentiated from the abovementioned known antibiotics, for example, in ultraviolet spectra, infrared spectra, color reactions, melting points or antimicrobial spectra. So, it is clear that Lateriomycin A is a novel antibiotic.

Lateriomycin B somewhat resembles the following known antibiotics in regard to the characteristics of changing its color between acid and alkaline reactions, and the molecular constituent:

(1) "Resistomycin" described in "Die Naturwissenschaften," volume 38, pages 479–480, published in October 1951.
(2) "Collinomycin" described in "Die Naturwissenschaften," volume 40, pages 166–167, published in March 1953.
(3) "Minomycin" described in "The Journal of Antibiotics" Series A, volume 13, pages 327–334; published in September 1960.
(4) "Ayamycin $A_2$" described in the specification of the U.S. Patent No. 3,088,872 issued on May 7, 1963.

But, in molecular analysis, ultraviolet spectra, infrared spectra, color reactions and antimicrobial spectra, Lateriomycin B is obviously differentiated from the above-mentioned known antibiotics. So, it is clear that Lateriomycin B is a novel antibiotic.

As is shown in Table 2, Lateriomycin A and Lateriomycin B inhibit strongly the growth of Gram-positive bacteria, especially those belonging to the genera Staphylococcus. Lateriomycin A and Lateriomycin B are, therefore, useful as a therapeutic agent for Staphylococcus diseases without giving substantial harm to host. For example, the Lateriomycins are useful, in topical preparations for the treatment of an infected wound due to Staphylococci.

The following examples set forth presently-preferred exemplary embodiments of the present invention; this is intended to be solely illustrative, however, and not at all limitative of the invention.

In the present specification as well as the following examples, the abbreviations μg., mg., g., ml., l. and °C. refer to microgram(s), milligram(s), gram(s), milliliter(s), liter(s) and degrees centigrade, respectively; percentages are weight/volume percentages unless otherwise described, and the antimicrobial activity of a solution containing the antibiotics or a powdery antibiotic is shown as agar dilution unit.

EXAMPLE 1

500 ml. of aqueous culture medium (pH 7.0) containing 3.0% of soluble starch, 2.0% of soy bean flour, 1.0% of meat extract and 0.5% of sodium chloride is inoculated with *Streptomyces griseoruber* No. 71070 (ATCC 17919), then the culture medium is incubated at 28° C. for 48 hours under shaking. The resulting culture broth is pre-incubated in 30 l. of aqueous culture medium of the same components as described above under aeration and agitation at 28° C. for 24 hours. The pre-culture is incubated in 500 l. of aqueous culture medium of the same components as above placed in a stainless steel fermenter at 28° C. for 96 hours under aeration and agitation.

Thus obtained culture is filtered to obtain 70 kilograms of wet mycelia. The mycelia are subjected to extraction with 150 l. of acetone by stirring for one hour. The extract is concentrated in vacuo to about one-thirtieth of the original volume to obtain an aqueous solution which shows antimicrobial activity of 15,000 units per ml. against *Bacillus subtilis*. The aqueous solution is adjusted to pH 7.5 and then subjected to extraction three times with ethylacetate, each in a quantity of one-third of the solution. Thus-obtained extract solution is subjected to further extraction thrice with 0.1 M phosphate buffer solution adjusted to pH 2.5 with diluted hydochloric acid, each in a quantity of one-third of the extract solution, whereupon a portion of active substances is shifted into the phosphate buffer fraction (designated as fraction MA, hereafter) and the rest remains in the ethyl acetate layer (designated as fraction MB).

Fraction MA, after being adjusted to pH 7.5, is subjected to extraction three times with ethyl acetate, each in a quantity of one-third of the fraction. The extract is washed twice with distilled water and then concentrated in vacuo, followed by the addition of 3 l. of petroleum ether to give orange yellow precipitates. The precipitates are collected by filtration, and dissolved in 30 ml. of a mixture methanol and ethyl acetate. To the solution is added 3 l. of diethyl ether under vigorous agitation to give precipitates. The precipitates are collected by filtration and air-dried to obtain 2.5 g. of orange yellow powder. The crude powder shows antimicrobial activity of 7,500 to 10,000 units per mg. *Bacillus subtilis*.

On the other hand, the filtrate portion obtained from the culture broth is subjected, in the same manner as described above, to extraction with ethyl acetate, followed by the extraction with 0.1 M phosphate buffer adjusted to pH 2.5. The phosphate buffer fraction is subjected to extraction with ethyl acetate, and the ethyl acetate solution is concentrated, followed by addition of petroleum ether thereto to obtain 1 g. of orange yellow powder.

1 g. of the crude powder is dissolved in 5 ml. of a mixture of methanol and ethyl acetate (1:1, by volume), and then the solution is passed through a column (2.5 centimeters in diameter, 30 centimeters in height) packed with 50 ml. of silica gel (0.08 millimeter in average granular size, Merck & Co., Inc., Germany). The column is washed with 1 l. of benzene at a rate of 20 ml. per hour, and then eluted with 2 l. of ethyl acetate at a rate of 2 ml. per hour to obtain about 1 l. of effluent showing antimicrobial action. The effluent is concentrated in vacuo to obtain orange red needles. The crystalline product is recrystallized from a mixture of ethyl acetate and methanol (2:1, by volume) to obtain about 200 mg. of Lateriomycin A as orange red needles.

On the other hand, the said fraction MB is washed with distilled water and concentrated in vacuo to obtain 300 ml. of dark reddish oily substance. The oily substance is dissolved in 300 ml. of methanol, and then the methanol solution is passed through a column (3 centimeters in diameter, 60 centimeters in height) packed with 150 ml. of silica gel (0.2 to 0.8 millimeters in granular size, Merck & Co., Inc., Germany). The column is washed with petroleum ether subsequently diethylether, and then eluted with 1 l. of ethyl acetate at a rate of 10 ml. per minute to obtain about 1 l. of effluent showing antimicrobial action. The effluent is concentrated in vacuo to obtain crude powder of Lateriomycin B. The crude powder is recrystallized from a mixture of ethyl acetate and methanol (1:1, by volume) to obtain 200 mg. of Lateriomycin B as orange needles.

EXAMPLE 2

This example exemplifies the usefulness of the novel products according to the present invention in vitro in combating pathogenic Gram-positive bacteria.

Staphylococci are pyogenic or pus-forming bacteria. Typically they tend to produce circumscribed lesions, e.g. in the form of abscesses and the like, which often occur in the skin. Staphylococci are the cause of furuncles and of carbuncles and other common wound infections. The new products of the invention are useful in topical preparations for the treatment of this type of infection. Thus, a useful preparation for topical application to an infection due to *Staphylococcus aureus* is as follows:

Into 100 mg. of wool fat are uniformly incorporated 5 mg. of Lateriomycin A and 3 mg. of Lateriomycin B and the mixture is then admixed uniformly with sufficient white petrolatum to make 1 g. of ointment.

Due to the disclosed bactericidal and bacteriostatic properties of the new products of the invention, these are also useful in vitro as antiseptics and disinfectants, e.g. to disinfect hospital apparatus, etc. which are generally exposed to pathogenic Gram-positive bacteria of the type which are sensitive to such products, as aforementioned.

Having thus disclosed the invention, what is claimed is:
1. Lateriomycin A, which has the following characteristics:
   (1) Its elementary analysis is C 60.15±0.50%, H 6.00 ±0.30% and N 2.00±0.50%;
   (2) Its specific rotation is $[\alpha]_D^{21} = +186° \pm 20°$ (c.= 0.7, in chloroform);
   (3) It melts with decomposition at 202–206° C.;
   (4) Its ultraviolet absorption spectrum is as shown on FIG. 1 of the accompanying drawing, and the significant maximum absorptions observed are as follows:

$\lambda_{max.}^{MeOH}$ 234 m$\mu$, 253 m$\mu$, 290 m$\mu$ (5) Its visible light absorption spectrum is as shown on FIG. 2 of the accompanying drawing, and the significant maximum absorptions observed are as follows:

$\lambda_{max.}^{MeOH}$ 480 m$\mu$, 495 m$\mu$, shoulder 533 m$\mu$ (6) Its infrared absorption spectrum is as shown on FIG. 3 of the acompanying drawing;
   (7) It is positive to Molisch's reaction and ferric chloride reagent, but negative to ninhydrin reaction, Fehling's reagent, biuret reaction, Ehrlich's reagent and Pauly's reagent;
   (8) It changes to orange yellow in a methanolic acid solution and to purple in an alkaline solution;
   (9) It is soluble in methanol, ethanol, butanol, acetone, chloroform and benzene and slightly soluble in diethyl ether, but insoluble in petroleum ether and water; and
   (10) It shows antimicrobial activity selectively against Gram-positive bacteria.

2. Lateriomycin B, which has the following characteristics:
   (1) Its elementary analysis is C about 65.21%, H about 5.22% and O about 30.09%;
   (2) Its specific rotation is $[\alpha]_D^{21} = -65° \pm 3°$ (c.= 0.06, in chloroform);
   (3) It melts with decomposition at 234–236° C.;
   (4) Its ultraviolet absorption spectrum is as shown on FIG. 4 of the accompanying drawing and the significant maximum absorptions observed are as follows:

$\lambda_{max.}^{MeOH}$ 236 m$\mu$, 253 m$\mu$, 290 m$\mu$ (5) Its visible light absorption spectrum is as shown on FIG. 5 of the accompanying drawing and the significant maximum absorptions observed are as follows:

$\lambda_{max.}^{MeOH}$ 490 m$\mu$, 529 m$\mu$ (6) Its infrared absorption spectrum is as shown on FIG. 6 of the accompanying drawing;
   (7) Its molecular weight is about 410 by osmometric method in chloroform;
   (8) It is positive to Molisch's reaction and ferric chloride reagent, but negative to biuret reaction and Fehling's reagent;
   (9) It changes to orange yellow in an acidic methanol solution to purple in an alkaline solution;
   (10) It is soluble in methanol, ethanol, butanol, acetone, chloroform and benzene, but insoluble in petroleum ether and water; and
   (11) It shows antimicrobial activity selectively against Gram-positive bacteria.

3. A method for producing a member selected from the group consisting of Lateriomycin A and Lateriomycin B, which comprises culturing Streptomyces griseoruber No. 71070 (ATCC 17919) in a medium containing assimilable carbon sources, digestible nitrogen sources and other nutrients necessary for the growth of the microorganisms at a temperature of about 25° C. to about 35° C. under aerobic conditions until substantial antimicrobial activity is imparted to the culture broth, extracting the culture broth with an organic solvent, extracting the resultant Lateriomycins-containing solution with an acid solution of pH about 2 to 6, dividing the Lateriomycins into basic and neutral fractions and recovering the desired antibiotic from one of the two resulting fractions.

4. A method for producing Lateriomycin A which comprises culturing Streptomyces griseoruber No. 71070 (ATCC 17919) in a medium containing assimilable carbon sources, digestible nitrogen sources and other nutrients necessary for the growth of the microorganisms at a temperature of about 25° C. to about 35° C. under aerobic conditions until Lateriomycin A is substantially accumulated in the culture broth, extracting the culture broth with an organic solvent, extracting the resultant Lateriomycins-containing solution with an acid solution of pH about 2 to 6, dividing the Lateriomycins into basic and neutral fractions and recovering the Lateriomycin A from the resulting basic fraction.

5. A method for producing Lateriomycin B, which comprises culturing Streptomyces griseoruber No. 71070 (ATCC 17919) in a medium containing assimilable carbon sources, digestible nitrogen sources and other nutrients necessary for the growth of the microorganisms at a temperature of about 25° C. to about 35° C. under aerobic conditions until Lateriomycin B is substantially accumulated in the culture broth, extracting the culture broth with an organic solvent, extracting the resultant Lateriomycins-containing solution with an acid solution of pH about 2 to 6, dividing the Lateriomycins into basic and neutral fractions, and recovering the Lateriomycin B from the resulting neutral fraction.

No references cited.

JEROME D. GOLDBERG, Primary Examiner

U.S. Cl. X.R.
424—122; 195—80